Oct. 29, 1957     R. E. SEIDEL     2,811,232
REVERSIBLE GRIP ROLLER FREEWHEEL CLUTCH
Filed Nov. 23, 1953
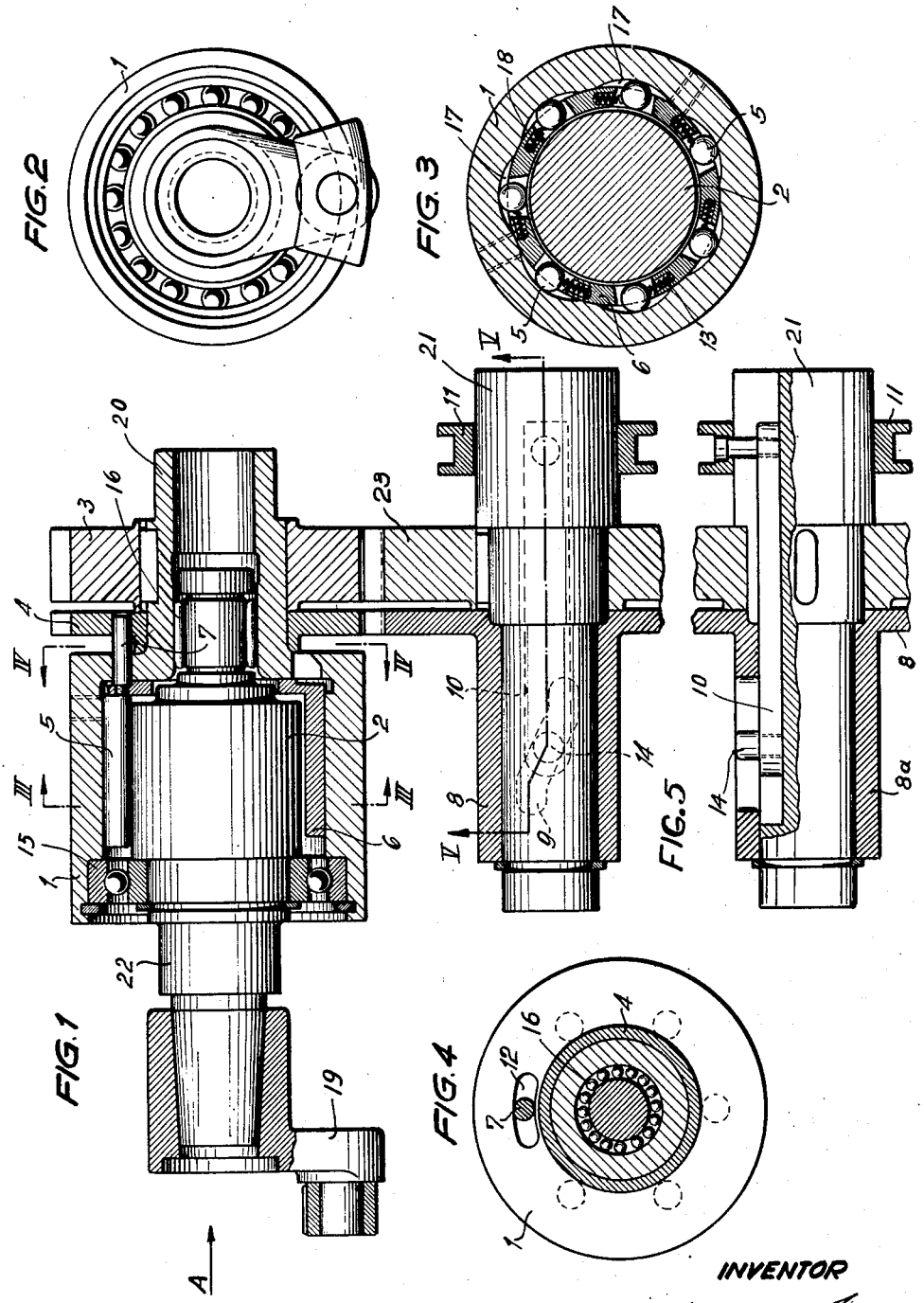
INVENTOR
Richard E. Seidel
By
Patent Agent

United States Patent Office

2,811,232
Patented Oct. 29, 1957

2,811,232

REVERSIBLE GRIP ROLLER FREEWHEEL CLUTCH

Richard E. Seidel, Bochum, Germany

Application November 23, 1953, Serial No. 393,850

1 Claim. (Cl. 192—44)

The present invention relates to freewheel clutches and, more specifically, to reversible grip roller freewheel clutches. Clutches of this general type are known in which the surfaces being contacted by the grip rollers have a shape which is unfavorable insofar as the radius of inclination is opposite to the radius of the bore in the outer clutch member. The drawback of such an arrangement consists in that the clamping bodies are at the instant of reversal thrown out of their position due to the occurring centrifugal forces. As a result thereof a retardation occurs in the force locking, and there also occurs a great slip between the inner and outer clutch member as well as a great noise. Inherent thereto is naturally great wear.

With these known clutches, the adjustment of the cage for the clamping bodies is effected by a linkage system or by hydraulic control means. Such adjusting mechanism in connection with said clutches has the drawback that the adjusting forces become too great and that consequently this type of clutches can be used only in connection with slow-speed machines or engines.

It is, therefore, an object of the present invention to provide a reversible grip roller freewheel clutch which will overcome the above mentioned drawbacks.

It is another object of this invention to provide a reversible grip roller freewheel clutch which is so designed that all clamping bodies or rollers will uniformly be held in their effective position at the instant of reversal of the clutch.

It is a still further object of this invention to provide a clutch of the type set forth in the preceding paragraph which will comprise adjusting or control means adapted considerably to reduce the adjusting forces.

These and other objects and advantages of the invention will appear more clearly from the following specification in connection with the accompanying drawings in which:

Fig. 1 is a longitudinal section through a clutch designed in conformity with the principle of the present invention.

Fig. 2 is a front view of the clutch as seen in the direction of the arrow A of Fig. 1.

Fig. 3 represents a section taken along the line III—III of Fig. 1.

Fig. 4 is a section through the outer clutch member with grip rollers and the cage therefor, said section being taken along the line IV—IV of Fig. 1.

Fig. 5 illustrates a section taken along the line V—V of Fig. 1.

General arrangement

According to the present invention, the bore of the outer clutch member is provided with axially symmetrical contact surfaces for receiving the clamping bodies or rollers while the cage for the clamping rollers is adjustably arranged. In order to make sure that all clamping bodies or grip rollers will uniformly be held in their effective positions, the cage for the clamping bodies may be provided with tangential bores in which are mounted compression springs which exert pressure upon the clamping bodies and maintain the same continuously and uniformly in contact with the adjacent surfaces of the outer clutch member.

In order to reduce the adjusting forces for adjusting the cage of the clamping body, the adjustment is effected, according to the present invention by means of a shift sleeve movable in axial direction on the output shaft and cooperating with a slot and key. The shift sleeve may be arranged on a shaft parallel to the clutch shaft and driven by the latter and is adapted by means of said key and slot to adjust a gear which meshes with another gear operatively connected to the cage for the gripping rollers.

Structural arrangement

Referring now to the drawing in detail, the outer clutch member 1 has mounted therein the inner clutch member 2 through the intervention of a ball bearing 15 and needle bearing generally designated 16. The outer clutch member 1 is provided with axially symmetrical contact surfaces 17 for cooperation with clamping bodies or grip rollers 5 held in a cage 6. In order to assure that the clamping bodies or grip rollers 5 will be maintained in continuous contact with the surfaces 17, the cage 6 is provided with tangential bores 18 having mounted therein compression springs 13. The inner clutch member 2 is driven through a crank 19. In order to be able to adjust the cage 6, the latter is provided with a stud 7 which extends through an arcuate slot 12 provided in the outer clutch member 1. The stud 7 is connected to a spur gear 4 rotatably mounted on the hub 20 of the outer clutch member 1. The arrangement is such that when the spur gear 4 rotates in one or the other direction, the stud 7 connected to said spur gear 4 will rotate the cage 6 in a corresponding direction.

In order to be able to rotate the spur gear 4 selectively in one or the other direction, a spur gear 8 is provided which meshes with the spur gear 4 and is mounted on a shaft 21 arranged substantially parallel to the clutch shaft 22 carrying the inner clutch member 2. Connected to the hub 20 is a pinion 3 which meshes with a pinion 23 connected to the shaft 21. Movable in axial direction on shaft 21 is a shift sleeve 11 having connected thereto one end of a key 10 the other end of which carries a pin or stud 14. The said pin or stud 14 engages a slot 9 provided in the hub 8a of the gear 8. It will thus be clear that by shifting the shift sleeve 11 in one direction, gear 8 and thus through gear 5 and stud 7 the cage 6 will be turned in one direction, while shifting movement of the shift sleeve 11 in the opposite direction will accordingly produce a turning of the cage 6 in the other direction. Therefore, depending on the shifting of cage 6 in one direction or the other direction, the shaft 21 will be rotated in one or the other direction by the driving shaft 12 through the intervention of the outer clutch member 1 and gears 3 and 23.

It is, of course, understood that the present invention is by no means limited to the particular construction described in the foregoing specification and shown in the drawings but also comprises any modifications within the scope of the appended claims.

What I claim is:

In combination with a reversible grip roller freewheel clutch having an outer and an inner clutch member and a cage adjustable in opposite directions from one effective position into another effective position for selectively making said clutch effective in either one of two opposite driving directions: an input shaft drivingly connected to said inner clutch member, an output shaft substantially parallel to the axis of rotation of said outer clutch member, said outer clutch member having a substantially concentric cylindrical extension connected thereto and being provided with an arcuate slot of a length corresponding to the desired adjusting range of said cage between the two effective positions thereof, a first gear supported by and rotatable on said extension, a pin extending through said arcuate slot and interconnecting said first gear and said cage, a second gear meshing with said first gear and mounted on said output shaft, said second gear being movable about said output shaft by an angle corresponding to the adjusting range of said cage, and a pair of gears drivingly interconnecting said extension and said output shaft.

References Cited in the file of this patent

UNITED STATES PATENTS

| | | |
|---|---|---|
| 592,213 | Smith | Oct. 19, 1897 |
| 838,024 | Henricks | Dec. 11, 1906 |
| 1,004,240 | Casgrain | Sept. 26, 1911 |
| 1,927,046 | Powell | Sept. 19, 1933 |
| 1,972,484 | Hobbs | Sept. 4, 1934 |
| 2,051,783 | Dake | Aug. 18, 1936 |

FOREIGN PATENTS

| | | |
|---|---|---|
| 836,041 | France | Oct. 10, 1938 |